US007225883B2

(12) United States Patent
Yamada et al.

(10) Patent No.: US 7,225,883 B2
(45) Date of Patent: Jun. 5, 2007

(54) DEVICE FOR COUPLING IMPLEMENT TO AGRICULTURAL TRACTOR

(75) Inventors: Shoichi Yamada, Matsumoto (JP);
Takao Yamamoto, Matsumoto (JP);
Seiji Okubo, Matsumoto (JP)

(73) Assignee: Kabushiki Kaisha DELICA, Nagano (JP)

( * ) Notice: Subject to any disclaimer, the term of this patent is extended or adjusted under 35 U.S.C. 154(b) by 329 days.

(21) Appl. No.: 11/055,111

(22) Filed: Feb. 11, 2005

(65) Prior Publication Data

US 2006/0005977 A1  Jan. 12, 2006

(30) Foreign Application Priority Data

Jun. 8, 2004  (JP)  ............................. 2004-169872

(51) Int. Cl.
*A01B 51/00* (2006.01)
(52) U.S. Cl. ........................ 172/272; 172/439; 280/508
(58) Field of Classification Search ................ 172/272, 172/439; 280/508, 509, 504, 514
See application file for complete search history.

(56) References Cited

U.S. PATENT DOCUMENTS

| 4,014,562 A | * | 3/1977 | Kunze ........................ 280/508 |
| 4,071,263 A | * | 1/1978 | Kunze ........................ 280/508 |
| 4,108,464 A | * | 8/1978 | von Allworden et al. ... 280/508 |
| 4,157,838 A | * | 6/1979 | von Allworden ........... 280/508 |
| 4,241,935 A | * | 12/1980 | Vollmer et al. ............. 172/272 |
| 4,366,967 A |   | 1/1983 | Vollmer et al. |
| 4,398,745 A | * | 8/1983 | Azzarello et al. ........... 280/508 |
| 4,958,848 A | * | 9/1990 | Nash ........................... 280/509 |
| 5,033,764 A | * | 7/1991 | Blacklaw .................... 280/508 |
| 5,050,684 A | * | 9/1991 | Vollmer ...................... 172/272 |
| 5,441,117 A |   | 8/1995 | Fartmann et al. |
| 5,497,835 A |   | 3/1996 | Laubner et al. |

FOREIGN PATENT DOCUMENTS

| EP | 0 850 789 B1 | 7/1998 |
| EP | 0 937 592 B1 | 8/1999 |
| JP | B2 2601409 | 1/1997 |
| WO | WO 02/085095 A2 | 10/2002 |

* cited by examiner

*Primary Examiner*—Victor Batson
(74) *Attorney, Agent, or Firm*—Oliff & Berridge, PLC

(57) ABSTRACT

The invention relates to a device for a coupling an agricultural implement to an agricultural tractor, in which the operation to release the coupling between the agricultural implement and the agricultural tractor can be easily implemented.

When the coupling of the agricultural tractor and the agricultural implement is released, first, a control lever of a coupling hook is slid upward against the urging force of a spring until a second guide pin reaches the lower end of a slit. Next, the control lever is turned forward around the second guide pin until a bent portion of the upper portion and the lower portion of the control lever comes into contact with a first guide pin. As a result, the rear end of a stopper is retracted into a cavity in the hook main body of the device through a second opening so as to slide to the coupling-ball-releasing position, and a groove of the stopper is hooked to a hooking pin so as to be fixed.

1 Claim, 5 Drawing Sheets

DEVICE FOR COUPLING IMPLEMENT TO AGRICULTURAL TRACTOR

BACKGROUND OF THE INVENTION

1. Field of the Invention

The present invention relates to a device for coupling an agricultural implement to an agricultural tractor.

2. Description of the Related Art

In general, a link is provided at the rear of an agricultural tractor. A device for coupling an agricultural implement (hereinafter referred to as "coupling device") is attached at the rear end of the link. When an agricultural implement is coupled to an agricultural tractor, first, a coupling ball provided in the front portion of the implement is accommodated in a hook portion provided in the coupling device of the agricultural tractor. Next, the coupling ball is locked with a stopper of the coupling device so as not to be escaped from the hook portion of the coupling device. When the coupling is to be released, first, the operator pulls a control lever of the coupling device so as to slide the stopper to the coupling-ball-releasing position, and the stopper is held in that position. Next, the coupling ball is removed from the hook portion of the coupling device to release the coupling.

European Patent No. 0937592 discloses a conventional coupling hook comprising a hook body, a blocking device, a control lever, resilient means and a pivoting lever. The hook body includes a hook-shaped portion housing a coupling ball. The blocking device is housed in a cavity of the main body. The blocking device can slide through a first opening (slit) so as to block and release the coupling ball. The control lever is housed in the cavity of the body. The upper portion of the control lever protrudes from a second opening. The control lever slides the blocking device so as to block and release the coupling ball. The resilient means are for holding the blocking device in the blocking position. The pivoting lever is rotatably coupled to the hook body, the blocking device and the control lever. In addition, the pivoting lever is coupled to the resilient means. The control lever includes a clamping tooth. The clamping tooth is provided in the middle in the vertical direction of the rear part of the control lever. The hook body includes a correspondingly shaped portion to the clamping tooth. The correspondingly shaped portion is provided on the outside of the hook body, in front of the first opening. When the coupling ball is released, the control lever is pulled upward so as to slide the blocking device into the cavity. Next, the control lever is turned backward so that the clamping tooth of the control lever engages with the correspondingly shaped portion provided on the body of the hook. Thus, the control lever is fixed to the body of the hook, and the coupling ball is released.

In addition, Japanese Patent No. 2601409 discloses a coupling hook comprising a hook body, a locking pawl and a closing spring. The hook body includes a bearing recess for accommodating a coupling ball. The locking pawl is provided in the hook body and blocks the coupling ball. The closing spring urges the locking pawl toward the locking position. When the coupling ball is released from the coupling hook, first, an opening lever is pulled so as to bring a supporting face into contact with a round bearing surface. The supporting face is a groove provided in the opening lever. The bearing face is provided in the boundary region of a through-aperture of the hook body. Next, the opening lever pivots around the round bearing surface so as to slide the blocking device to a releasing position where the locking pawl releases the bearing ball. Next, a second fixing stop is brought into contact with an arresting stop. The second fixing stop is provided on the opposite side of the opening lever from the supporting face. The arresting stop is provided on a region at the outside of the hook body across the opening from the bearing face. At the same time, the opening lever is slid toward the bearing recess. Following the supporting face of the opening lever, a first fixing stop is retracted so as to rest on the bearing face. The opening lever is thus fixed to the hook body.

The coupling hook of the above-mentioned European Patent includes a blocking device, a control lever, a lever element and resilient means on top of the hook body. Therefore, there are a large number of parts and the cost can be high. In addition, for the release of the engaged coupling ball, the control lever needs to be pulled, to be turned backward while retaining the pulling state, and to be engaged with the hook body. Thus, the operation from the driver's seat, which is located diagonally in front of the coupling hook, becomes complicated.

In the coupling hook of the above-mentioned Japanese Patent No. 2601409, for release of the coupling ball is released, a plurality of steps are necessary. That is to say, (1) pulling the opening lever upward so as to slide the blocking device to the releasing position where the locking pawl releases the bearing ball, (2) having the opening lever pivot around the bearing surface provided in the through-aperture of the hook body from the state that the opening lever is pulled, and (3) after having the opening lever pivot, sliding the opening lever toward the bearing recess so as to bring the first and second fixing stops of the opening lever into contact with the arresting stop and the bearing face provided in the through-aperture, respectively. Therefore, operation for releasing the coupling is complicated.

SUMMARY OF THE INVENTION

An object of the present invention is to provide a device for coupling an agricultural implement to an agricultural tractor, the device being composed of a small number of parts and being capable of being operated easily from the driver's seat when the coupling is released.

In the present invention, a device for coupling an agricultural implement to an agricultural tractor includes a hook main body, a stopper, a control lever and a spring. The hook main body includes a hook portion and a cavity provided by the side of the hook portion. The hook portion accommodates a coupling ball provided at the front end of the implement. The stopper is housed in the cavity. The stopper is capable of sliding through a second opening of the cavity toward the hook portion so as to lock the coupling ball. The control lever is capable of sliding through a first opening of the cavity and sliding the stopper between a coupling-ball-releasing position and a coupling-ball-locking position. The spring is provided in the cavity. The spring is capable of urging the stopper and the control lever downward. An engaging pin is provided in the upper portion of the cavity. A guide pin is provided in the middle of the cavity. The stopper includes a first end for locking the coupling ball and a second end having a groove disposed on the bottom thereof. The control lever is L-shaped and includes an upper portion and a lower portion. The upper portion extends upward through the first opening. The lower portion extends from the lower end of the upper portion in a direction opposite from the hook portion. A slit is provided in the lower end of the lower portion. The slit extends obliquely upward in a direction opposite from the hook portion when the control lever is fitted to the hook main body. The guide pin is inserted into the slit. The stopper and the control lever are rotatably coupled together by a pivot pin. The pivot pin is disposed in the vicinity of the groove of the stopper and on the boundary between the upper portion and the lower portion of the control lever. When the control lever is pulled upward against the urging force of the spring until the guide pin reaches the lower end of the slit, and is then turned around the guide pin so as to hook the groove to the engaging pin, the first end of the stopper slides to the coupling-ball-releasing position and is held in the position.

When the coupling of the agricultural tractor and the implement is released, first, the control lever of the coupling hook is slid upward against the urging force of the spring until the guide pin reaches the lower end of the slit. Next, the control lever is turned slightly forward around the guide pin so as to hook the groove provided in the stopper to the engaging pin provided in the hook main body. As a result, the first end of the stopper is retracted into the cavity in the hook main body so as to slide to the coupling-ball-releasing position, and is held in the position. Next, the coupling ball is removed from the hook portion of the hook main body.

On the other hand, the control lever of the coupling hook is turned slightly backward so as to unhook the groove provided in the stopper from the engaging pin provided in the main body. As a result, urged by the spring, the control lever moves downward, and the guide pin moves upward relatively in the slit. At the same time, the stopper moves toward the hook portion of the hook main body so as to press the top of the coupling ball. The coupling ball is thus locked by the stopper, thereby the agricultural tractor and the implement are coupled together.

According to the present invention, the control lever is provided with a slit extending obliquely upward. Therefore, when the coupling is released, the operator has only to slide the control lever obliquely upward, toward the driver's seat, and then to turn the control lever slightly forward. The operation from the driver's seat is thus very simple, so the hook is useful. In addition, since the stopper can be operated only with the control lever, the hook only requires a few parts, and the cost is consequently low.

BRIEF DESCRIPTION OF THE DRAWINGS

In FIG. 1, a coupling ball is locked by a stopper.

DESCRIPTION OF THE PREFERRED EMBODIMENTS

The preferred embodiments of the present invention will now be described with reference to FIGS. 1 to 6.

Figure 6:
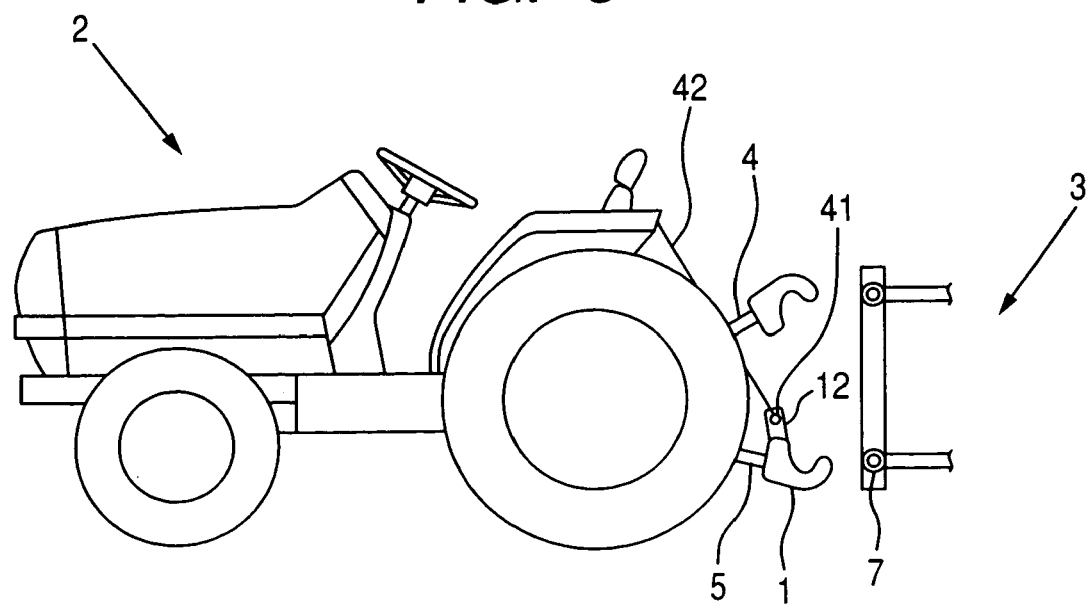
FIG. 6 shows an agricultural tractor having a link to which the device according to the embodiment of the present invention is attached.

FIG. 6 shows an agricultural tractor 2 having an upper link 4 and a lower link 5 at its rear end. A coupling device 1 to which an agricultural implement 3 is coupled is attached to the rear end of the lower link 5. A coupling ball 7 provided at the front end of the agricultural implement 3 is locked in the coupling device 1, whereby the agricultural tractor 2 and the agricultural implement 3 are coupled together.

As shown in FIGS. 1 to 4, the coupling device 1 for coupling the agricultural implement 3 to the agricultural tractor 2 according to the present invention mainly includes a hook main body 10 having a hook portion 8 for accommodating the coupling ball 7 and a cavity 9 provided by the side of the hook portion 8; a stopper 11 disposed in the cavity 9 and for locking the coupling ball 7; a control lever 12 coupled to the stopper 11 and for sliding the stopper 11 in the range between a position where the stopper 11 locks the coupling ball 7 and a position where the stopper 11 releases the coupling ball 7; and a spring 13 for urging the stopper 11 and the control lever 12 downwardly.

Figure 1:
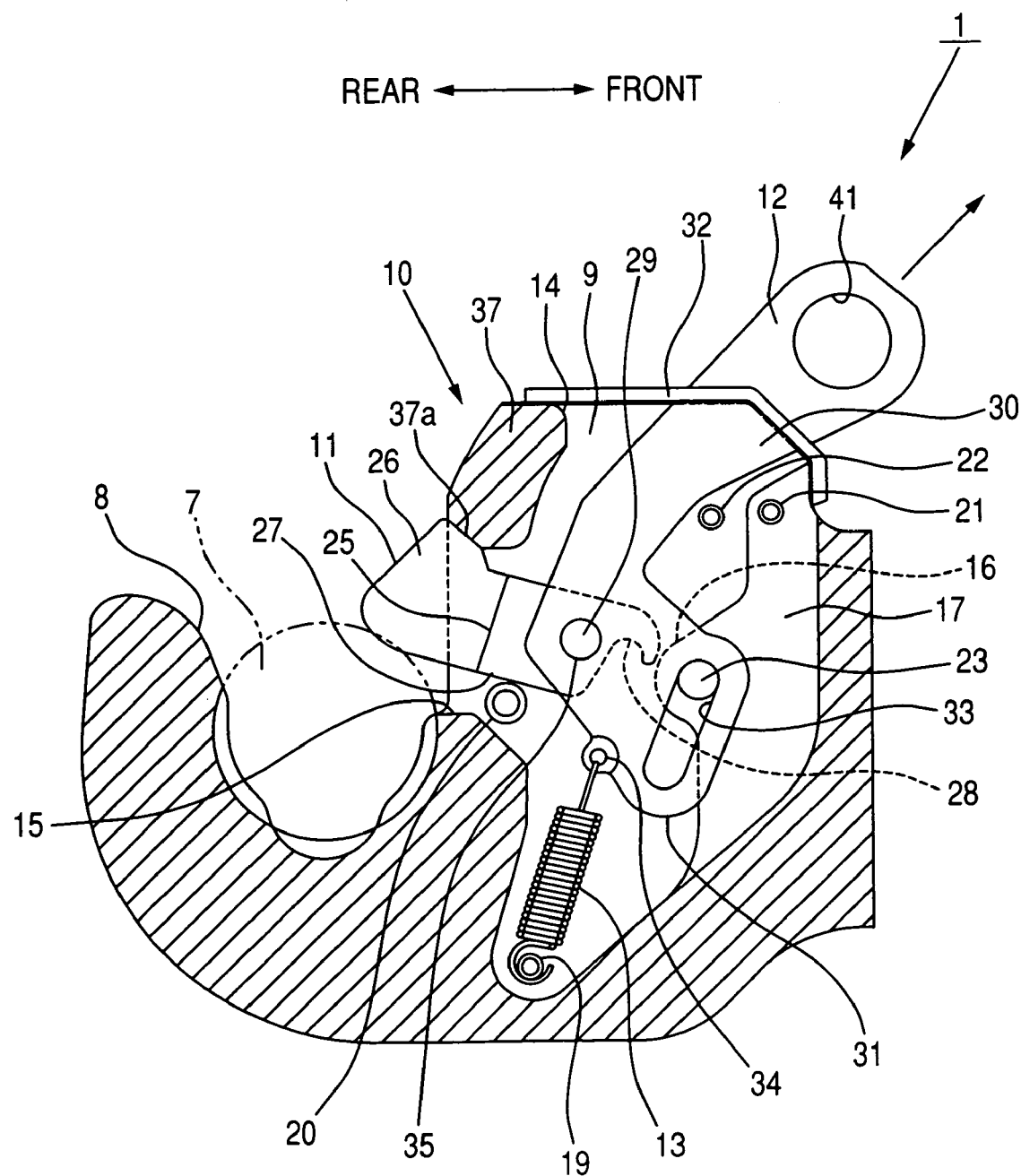
FIG. 1 shows the inside of a device for coupling an agricultural implement to an agricultural tractor according to an embodiment of the present invention.
Figure 2:
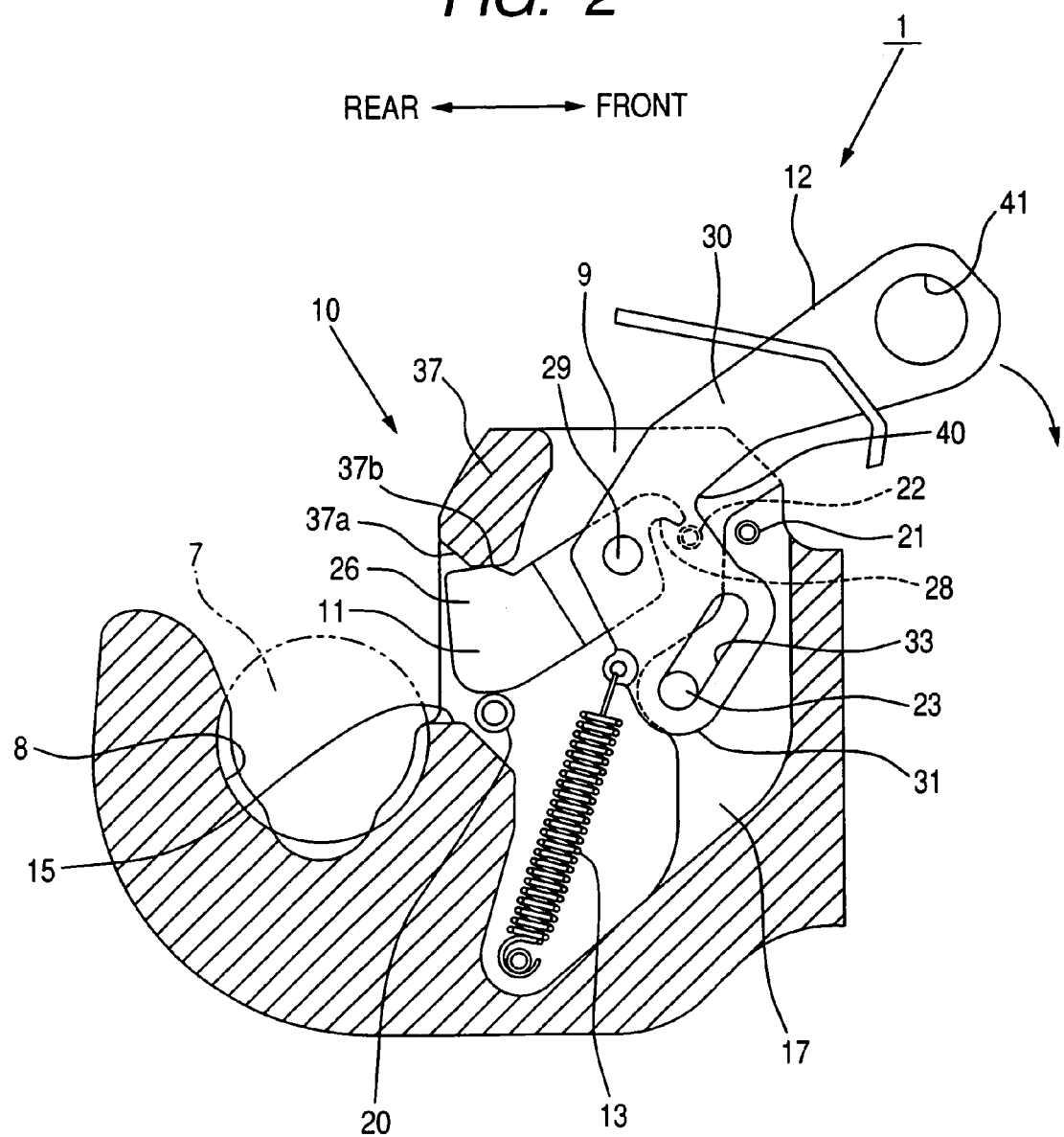
FIG. 2 shows the device in which the coupling ball is being released.
Figure 3:
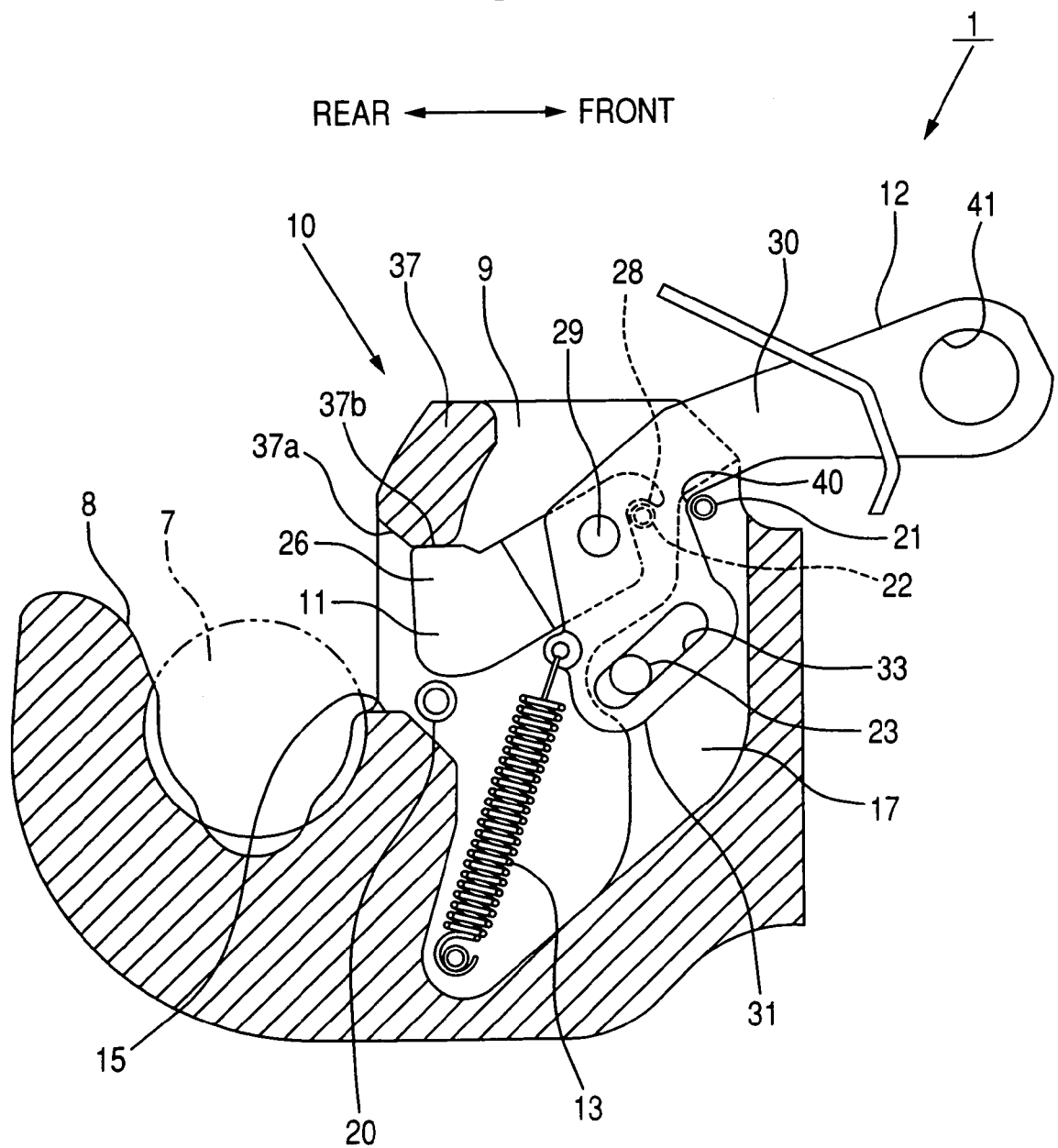
FIG. 3 shows the device in which the coupling ball is completely released.

As shown in FIGS. 1 to 3, the hook main body 10 includes the hook portion 8 for accommodating the coupling ball 7 and the cavity 9 which is disposed in front side of and by the side of the hook portion 8 and houses the stopper 11, the control lever 12 and the spring 13.

Figure 4:
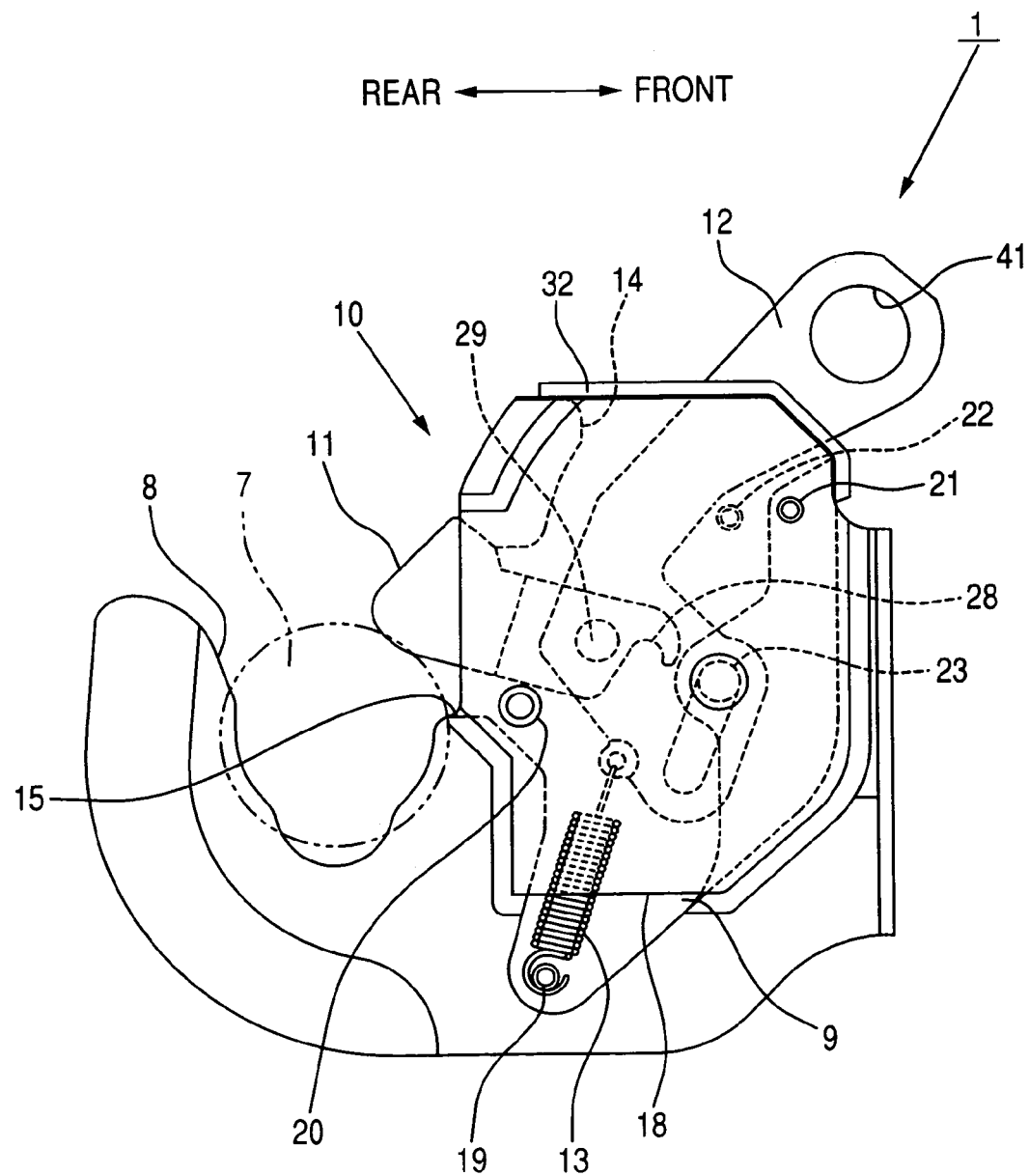
FIG. 4 shows the device with a side cover attached.
Figure 5:
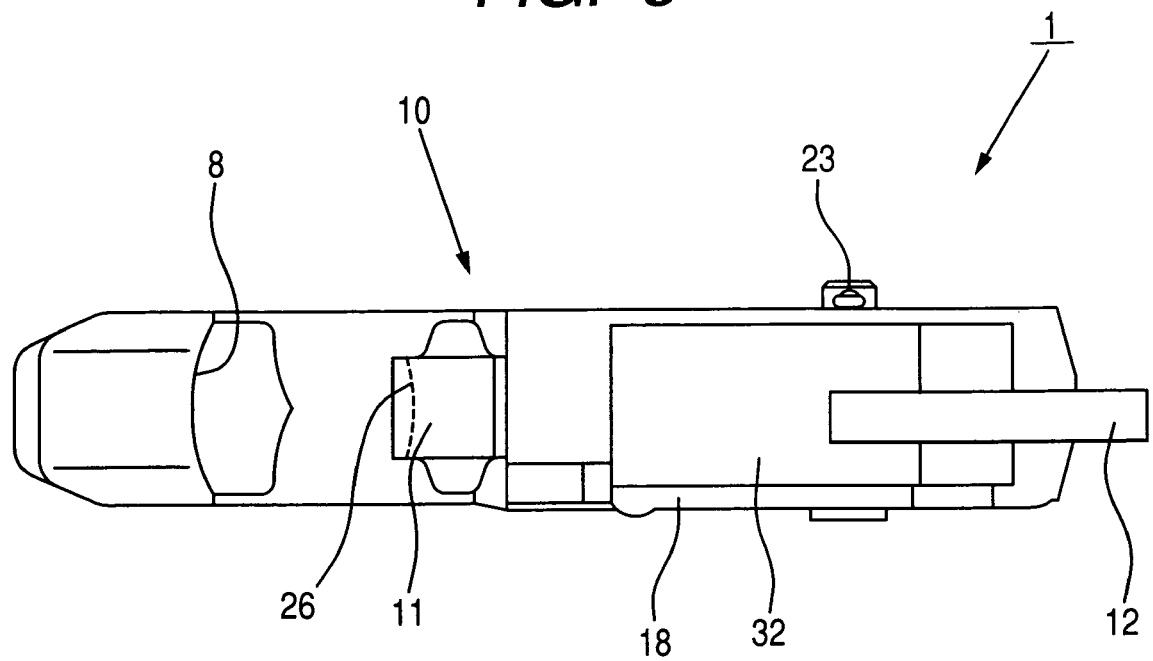
FIG. 5 is a top plan view showing the device with a side cover attached.

At the upper end of the cavity 9, a first opening 14 through which the control lever 12 is slidably inserted is provided. At the rear end of the cavity 9 (on the hook portion 8 side), a second opening 15 through which the stopper 11 is slidably inserted is provided. In addition, on the opposite side of the cavity 9 from the hook portion 8, a bank (stepped) portion 17 is provided. The bank portion 17 extends with a predetermined length from the front end (on the right in FIG. 1) of the cavity 9 to the hook portion 8 side (at the rear). The thickness of the bank portion 17 is smaller than that of the main body 10. At the rear end of the bank portion 17, a protrusion 16 which protrudes with curve toward the hook portion 8 is formed. One side wall in the width direction of the cavity 9 is opened, and this opened portion is fixed by a cover 18 which is constituted separately, as shown in FIG. 4.

As shown in FIGS. 1 to 5, at the lower portion of the cavity 9, a hooking pin 19 protrudes from an other side wall of the cavity 9. The lower end of the spring 13 is hooked to the hooking pin 19. The length of the hooking pin 19 is substantially the same as the depth of the cavity 9. In addition, at the lower side of the second opening 15, a third guide pin 20 also protrudes from the other side wall of the cavity 9. The end of the third guide pin 20 is fixed to the cover 18. Furthermore, a first guide pin 21 is provided at the upper end of the bank portion 17, and the end of the first guide pin 21 is fixed to the side cover 18. An engaging pin 22 protrudes from the side wall of the cavity 9 at a position with a predetermined distance from and behind the first guide pin 21. The length of the engaging pin 22 is substantially the same as the thickness of the bank portion 17. Under the engaging pin 22 and in almost middle of the cavity 9, the protrusion 16 of the bank portion 17 is located. A second guide pin 23 is extendingly provided in the protrusion 16, and the end of the second guide pin 23 is also fixed to the cover 18.

As shown in FIGS. 1 to 5, the stopper 11 is block-shaped and the thickness of the stopper 11 is different on the boundary (boundary line 25 in FIG. 1) which is almost central in the front and rear direction, i.e., the thickness of a rear half 26 (which locks the coupling ball 7) of the stopper 11 is different from that of a front half 27 of the stopper 11. The thickness of the rear half 26 is slightly smaller than the thickness (whole width) of the hook main body 10. The thickness of the front half 27 is substantially set to be the same as that of the bank portion 17. A groove 28 which is in a shape of semi-circle and faces downwardly is provided on the front end of the stopper 11. A pivot pin 29 is provided slightly behind and in the vicinity of the groove 28.

The control lever 12 is in a shape of L-letter and includes an upper block portion 30 and a lower block portion 31. The upper block portion 30 is slidably inserted vertically through the second opening 14. The lower block portion 31 extends from the lower end of the upper block portion 30 to the forward. Near the middle of the upper block portion 30, a cover 32 for covering the first opening 14 is provided. The control lever 12 and the cover 32 are formed as a one piece. Regarding the control lever 12, an upper part of the upper block portion 30 over the position where the upper block portion 30 is formed with the cover 32 as one piece is thinner in its thickness than the part under that portion and is provided with a hole 41 to which a rope 42 is fixed (see FIG. 6). The part under the position where the control lever 12 is formed with the cover 32 as one piece and the lower block portion 31 have their thickness substantially equal to the distance between the face of the bank portion 17 and the cover 18. A slit 33 is provided at the front end of the lower block portion 31, which rests against the bank portion 17. In a state that the control lever 12 is fitted to the hook main body 10, the slit 33 extends obliquely upward in a direction opposite from the hook portion 8 side (forward). A spring-hooking hole 34 is formed slightly behind and at a distance from the lower end of the slit 33. The upper end of the spring 13 is hooked to the spring-hooking hole 34. In addition, a pivot-pin hole 35 is formed near a connected portion of the upper block portion 30 and the lower block portion 31 of the control lever 12. The pivot pin 29 provided in the stopper 11 is inserted into the pivot-pin hole 35.

Now, the arrangement of the components at the state that the coupling ball 7 is accommodated in the hook portion 8, and the upper face of the coupling ball 7 is pressed by the lower face of the rear half 26 of the stopper 11 and locked will be described.

As shown in FIG. 1, the rear end of the stopper 11 protrudes rearward through the second opening 15, and the groove 28 at the front end of the stopper 11 is disposed to be adjacent to the protrusion 16 of the bank portion 17. At this time, the lower face of the rear half 26 of the stopper 11 is in contact with the upper face of the coupling ball 7. The upper face of the rear half 26 of the stopper 11 is in contact with an inclined face 37a which is provided at the lower face of a body 37 of the hook main body 10 in such a way to incline rearwardly and upwardly. The lower face of the front half 27 of the stopper 11 is disposed to be adjacent to the third guide pin 20. The lower portion 31 of the control lever 12 rests on both of the front half 27 of the stopper 11 and the protrusion 16 of the bank portion 17 so that the lower portion 31 extend over the both. In that state, the pivot pin 29 of the stopper 11 is pivoted into the pivot-pin hole 35 of the control lever 12 and thus, the stopper 11 and the control lever 12 are thus rotatably coupled together via the pivot pin 29. The second guide pin 23 extendingly provided from the bank portion 17 is inserted into the slit 33 of the lower block portion 31 of the control lever 12, so that the second guide pin 23 can slide relatively along the slit 33. In addition, the spring 13 is hooked to the spring hooking hole 34 of the control lever 12 and the hooking pin 19 provided at the bottom of the cavity 9. By this spring 13, the control lever 12 is urged downwardly, the second guide pin 23 is located at the upper end of the slit 33, the lower potion of the rear half 26 of the stopper 11 is urged in the direction where the upper face of the coupling ball 7 is pressed, and the coupling ball 7 is held to be locked in the hook portion 8 of the hook main body 10 by the stopper 11.

The spring 13 may be attached to the stopper 11 so as to exert an urging force directly to the stopper 11.

In order to release the coupling ball 7 from the hook portion 8 of the main body 10, the control lever 12 is pulled upwardly to relatively slide along the second guide pin 23 (in the direction of the arrow in FIG. 1) until the second guide pin 23 reaches the lower end of the slit 33. As a result, as shown in FIG. 2, the spring 13 is extended, and the stopper 11 slides so as to rise upwardly with the rise of the control lever 12. The upper face of the rear half 26 of the stopper 11 slides along the body 37 from the inclined face 37a to a horizontal face 37b provided at the lower face of the body 37, and also, the lower face of the rear half 26 of the stopper 11 slides along the third guide pin 20. Then, the rear half 26 of the stopper 11 is retracted into the cavity 9 through the second opening 15, and the groove 28 of the stopper 11 becomes adjacent to the engaging pin 22.

Next, from the state shown in FIG. 2, the control lever 12 is turned around the second guide pin 23 in the direction of the arrow in FIG. 2 until a bent portion 40 at the connected portion of the upper portion 30 and the lower portion 31 of the control lever 12 comes into contact with the first guide pin 21. As a result, as shown in FIG. 3, the groove 28 of the stopper 11 is engaged with the engaging pin 22 and the rear half 26 of the stopper 11 is further retracted into the cavity 9. Then, the upper face of the rear half 26 of the stopper 11 comes into contact with the horizontal face 37b at the lower face of the body 37. At this time, the stopper 11 is fixed to the hook main body 10 in a state that the lower face of the rear half 26 of the stopper 11 is adjacent to the third guide pin 20.

Now, the procedure for locking the coupling ball 7 accommodated in the hook portion 8 by means of the stopper 11 from the state shown in FIG. 3 will be described. First, the control lever 12 is slightly turned backward (counter-clockwise in FIG. 3) so as to disengage the groove 28 of the stopper 11 from the engaging pin 22. Urged by the spring 13, the control lever 12 moves downward, and the second guide pin 23 moves upward relatively along the slit 33. At the same time, the stopper 11 slides toward the hook portion 8. The upper face of the rear half 26 of the stopper 11 slides along the body 37 from the horizontal face 37b to the inclined face 37a, and the lower face of the rear half 26 of the stopper 11 slides over the third guide pin 20, so that the rear end of the stopper 11 slides from the second opening 15 to the hook portion 8 side and the rear end of the stopper 11 thus comes into contact with the inclined face 37a of the upper rear wall 37. At this time, as shown in FIG. 1, the lower face of the rear half 26 of the stopper 11 comes into contact with the upper face of the coupling ball 7 so as to lock the coupling ball 7.

As described above, according to the coupling device 1 of the embodiment of the present invention, the operation for releasing the coupling of the agricultural tractor 2 and the agricultural implement 3 is very simple. That is to say, the control lever 12 of the coupling device 1 is pulled toward the driver's seat, and is then turned slightly forward around the second guide pin 23 so as to hook the groove 28 of the stopper 11 to the engaging pin 22 of the hook main body 10.

On the other hand, when the agricultural tractor 2 and the agricultural implement 3 are coupled together, the coupling ball 7 of the implement 3 is accommodated in the hook portion 8 of the coupling device 1 at the rear end of the agricultural tractor 2, and the control lever 12 of the coupling hook 1 is turned slightly backward. Urged by the spring 13, the control lever 12 moves downwardly via the second guide pin 23 which moves upward relatively along in the slit 33. The lower face of the rear end of the stopper 11 presses the upper face of the coupling ball 7. The coupling ball 7 is thus coupled to the coupling device 1.

In addition, according to the coupling device 1 of the present invention, no intermediary member is disposed between the stopper 11 and the control lever 12, and the stopper 11 is directly operated by means of the control lever 12. Therefore, the number of parts required for the coupling device 1 is small. Moreover, since the operation for releasing the coupling from the driver's seat is very simple, the coupling device is useful.

What is claimed is:

1. A device for coupling an agricultural implement to an agricultural tractor comprising a hook main body including a hook portion for accommodating a coupling ball provided at the front end of the agricultural implement and a cavity provided by the side of the hook portion, a stopper housed in the cavity and for sliding through an opening at the hook portion of the cavity toward the hook portion so as to lock the coupling ball, a control lever for sliding through an upper end opening of the cavity and making the stopper slide between a coupling-ball-releasing position and a coupling-ball-blocking position, and a spring for urging the stopper and the control lever downward in the cavity, the device for coupling an agricultural implement to an agricultural tractor is characterized in that an engaging pin is provided in an upper portion of the cavity of the hook main body, and a guide pin is provided in the middle of the cavity;

the stopper includes an end for locking the coupling ball and the other end opposed to said end and having a groove disposed downwardly;

the control lever is L-shaped and includes an upper block portion and a lower block portion, and the upper block portion extends upwardly through an upper-end opening of the cavity and the lower block portion extends from a lower end of the upper block portion in a direction opposite from the hook portion side;

a slit is provided in a lower end of the lower block portion, and the slit extends obliquely upward in a direction opposite from the hook portion side when the control lever is fitted to the hook main body, and the guide pin is inserted into the slit;

the stopper and the control lever are rotatably coupled together by a pivot pin, and the pivot pin is disposed in the vicinity of the hook portion side of the groove of the stopper and on the boundary of the connected portion of the upper block portion and the lower block portion of the control lever so as to be rotatably connected; and when the control lever is pulled upwardly along the guide pin against the urging force of the spring until the guide pin reaches an almost lower end of the slit, and is then turned around the guide pin so as to hook the groove to the engaging pin, the end of the stopper for locking the coupling-ball slides to the coupling-ball-releasing position and is held in the position.

* * * * *